Oct. 23, 1956    E. L. HODGSON    2,767,822
BALE LOADING DEVICE
Filed Aug. 18, 1955    2 Sheets-Sheet 1

INVENTOR.
Ernest L. Hodgson
BY
Thos. E. Scofield
ATTORNEY.

Oct. 23, 1956 E. L. HODGSON 2,767,822
BALE LOADING DEVICE
Filed Aug. 18, 1955 2 Sheets-Sheet 2
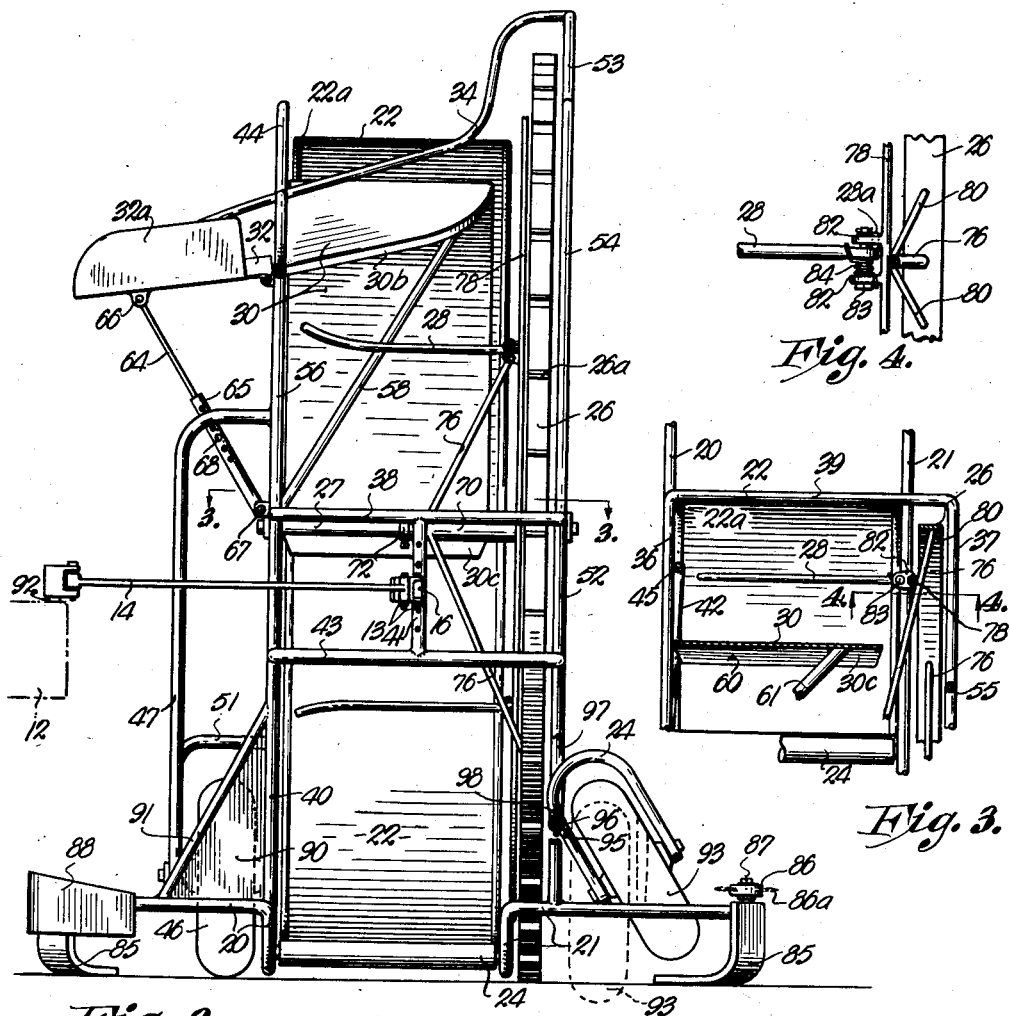
INVENTOR.
Ernest L. Hodgson
BY
ATTORNEY.

United States Patent Office 2,767,822
Patented Oct. 23, 1956

2,767,822

BALE LOADING DEVICE

Ernest L. Hodgson, Burlingame, Kans., assignor to M. V. Welch, Herington, Kans.

Application August 18, 1955, Serial No. 529,117

20 Claims. (Cl. 198—7)

The present invention relates in general to farm machines, and it deals more particularly with a device for loading bales of hay or the like onto a moving vehicle.

Conventionally, the baling operation takes place in the field, where it is performed by tractor-drawn or self-propelled equipment that drops each bale as it is completed. Accordingly, at the end of this operation the bales are distributed over the entire field, and in the past it has been necessary to collect them by driving a truck, trailer or wagon along the rows of bales and loading them onto the vehicle by hand.

Broadly speaking, the object of the present invention is to eliminate part or all of the manual labor involved in loading the bales onto the vehicle and thus make it possible to collect them much more easily and speedily than heretofore has been the case.

Another object is to provide a bale loader which is attachable to the vehicle in which the bales are to be collected so that it requires no power other than that supplied by the vehicle itself.

A feature of the invention resides in providing a bale loader which has its own wheeled carriage adapted to run on the ground alongside the collecting vehicle; and a further object is to provide adjustable means for hitching the loader to the bed of the vehicle for towing purposes, regardless of the height of the bed.

Another object is to provide a loader which will function reliably even if the bales in a given row are spaced at uneven intervals and even if some of them lie on the ground in canted or oblique relation to the path of the loader as it travels along the row.

Still another object is to provide a bale loader which is very easy to use and to manipulate; which handles the bales rapidly and which is trouble-free in operation as well as being sturdy and long lived.

A further object is to provide a bale loader which can be towed at high speeds along the highway to and from a site of operations, and which can easily and quickly be converted from field operating condition to highway traveling condition, or vice versa.

Yet another object is to provide a loader of the character indicated which is relatively easy to fabricate, inexpensive to manufacture, easy to service and maintain and which is as small in size and light in weight as possible.

Other and further objects of the invention together with the features of novelty whereby the objects are achieved will appear in the course of the following description.

In the drawings which form a part of the specification and are to be read in conjunction therewith and in which like reference numerals indicate like parts of the various views:

Fig. 2 is a front elevational view of same with parts broken away for purposes of illustration;

Fig. 3 is a cross-sectional view of the rear portion of my device taken approximately along the line 3—3 of Fig. 2 in the direction of the arrows, the ground engaging wheel being turned approximately 45° from its Fig. 2 position, however, for purposes of illustration;

Fig. 4 is an enlarged sectional elevation taken along the line 4—4 of Fig. 3 in the direction of the arrows;

Fig. 5 is a somewhat schematic side elevational view showing same on a reduced scale.

Figures 1, 6:
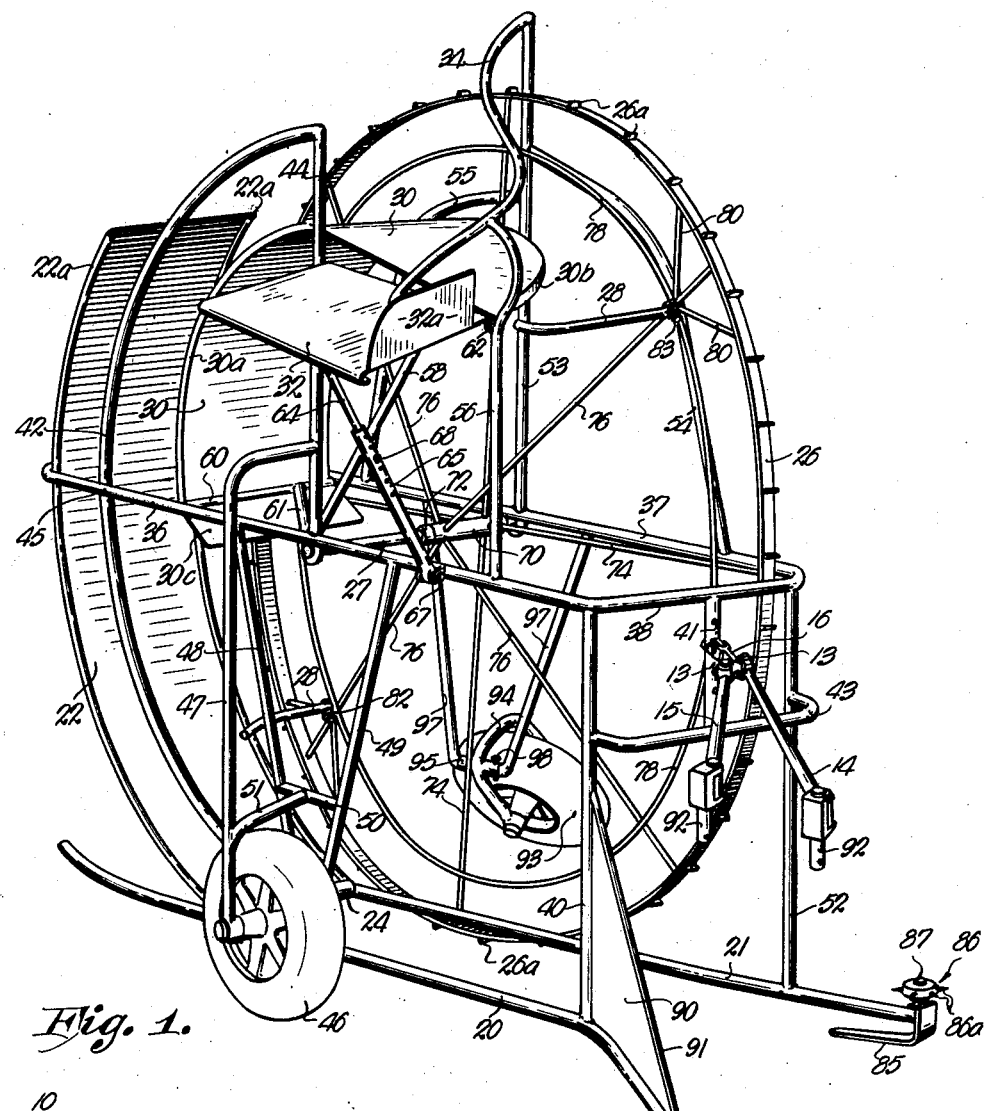
Fig. 1 is a perspective view of my improved bale loading device.
Fig. 6 is a plan view showing the manner in which my device is connected to a flatbed truck for the purpose of loading bales onto the truck.

My device may be employed for loading bales onto a truck, trailer or wagon, and it will be helpful at the outset to explain its general mode of operation as well as its principal parts. Referring to Fig. 6, the numeral 10 designates a truck having a flat bed 12. Extending laterally from one side of the truck bed are a pair of arms 14, 15, the outer ends of which are joined by a yoke 16. My device has a wheeled carriage or frame which is attached to the yoke in such manner that it will trail the yoke in parallel relation to the truck bed as the truck travels along the field in the direction indicated by arrow 17.

In practice, the truck is driven along the field parallel to the row of bales 18 to be picked up whereby my loader travels along a path aligned with the row. The lower portion of my wheeled carriage comprises a pair of laterally spaced longitudinal guides 20, 21 which are spaced slightly above the ground. These are parallel to one another through the major portion of their length but diverge at their forward ends to form a relatively wide entrance for the bales lying on the ground; accordingly, as my loader approaches a bale, the two guides advance along opposite sides thereof and if the bale is slightly offset from the path of the loader or if it is lying slightly oblique to that path, the bale will be shifted and/or turned as the guides pass along its sides, thereby to bring it into proper longitudinal orientation with my device.

Rearwardly of the aforementioned bale entrance, my loader has an upwardly curving outer chute 22 best seen in Figs. 1 and 5. The lower end of this chute is positioned close to the ground and between the guides 20, 21 so that the forward motion of the carriage tends to cause the bale to advance onto the lower portion of the chute; a freely turning roller 24 supported on the two guides adjacent the lower end of the chute assists the entry of the bale onto the chute.

Due to the upward inclination of this chute, the bale naturally will not travel very far up the chute without assistance, and in practice it normally remains partly on the chute and partly off for a short interval of time during which it is pushed along the ground by the forward motion of the carriage of my loader. However, I provide on my device a large ground-engaging wheel 26 whose axle 27 is approximately concentric with the curvature of chute 22. At diametrically opposite points on this wheel are a pair of laterally projecting pusher bars 28, one of which after a brief interval will advance into engagement with the end of the bale and push it up the chute as shown in Fig. 5.

The upper portion of chute 22 curves forwardly in a manner which tends to cause the bale to fall forwardly when it passes above the level of axle 27. To prevent the bale from toppling from pusher bar 28 at this point, I provide an inner chute 30 concentric with the aforementioned upper portion of the outer chute 22. The inner chute continues upwardly and forwardly in an arc and at its forward end communicates with a discharge chute 32 which projects laterally over the truck bed. After the bale passes above the level of axle 27 and "lays over" on chute 30, pusher bar 28 continues to advance it along the latter chute until it reaches a position opposite the discharge chute; and there it is diverted laterally onto the discharge chute by a curved guide 34 on the frame of my loader.

Each bale entering the guides 20, 21 as my device travels along the field thus is lifted in the same fashion and as each in turn is discharged onto the bed 12 of the truck, workmen riding thereon can transfer them to neat stacks as shown at 18a (Fig. 6).

With this brief outline of the construction and mode of operation of my loader, let us now turn to a fuller consideration of its details and features. Referring to Figs. 1 to 3, axle 27 is carried approximately midway between the ends of an elongate generally rectangular frame having side members 36, 37 and end members 38, 39. This frame, like the other framework elements of the carriage of my loader, conveniently can be made of metal pipe or tube bent as shown and welded at joints or connections to form a rigid structure.

Side member 36 is spaced above the straight portion of guide 20 in the same vertical plane. They are rigidly connected by a post 40 at the forward end of member 36 and by a curved guard rail 42 near the rear end. A post 44 extending upwardly from member 36 near axle 27 supports the upper end of the curved guard rail; the lower end of the rail is welded to the guide 20 and the rail also is welded to member 36 where the two cross at 45. Outside of guide 20 there is a small freely rotatable rubber-tired wheel 46 whose axle is supported by the frame members 47 to 51 inclusive as will be readily apparent from Fig. 1.

Side member 37 is spaced outwardly from a vertical plane through the straight portion of guide 21 as can best be seen in Fig. 3 so that with wheel 26 positioned inside of frame member 37 the ground engaging tread portion of the wheel lies outside of guide 21. As is evident, member 37 is supported in part by the wheel and in part by a post 52 extending downwardly to the outwardly diverging forward portion of the guide 21. Extending upwardly from member 37 is a central post 53 and braces 54, 55 which together form a rigid truss assembly that resists upward or downward bending of member 37 in a longitudinal direction. The upper end of post 53 projects above wheel 26 and supports one end of the curved discharge guide 34; the opposite end of the latter is supported by a post 56 extending upwardly from the side member 36.

Outer chute 22 is formed of relatively heavy sheet metal and preferably has both edges 22a rolled or otherwise strengthened to give the chute rigidity in a circumferential direction. Its lower extremity also can be reinforced by a transverse backing member (not shown) whose ends are secured to the longitudinal guides 20, 21. At the point where this chute crosses the end member 39 (see Fig. 3), it is welded or otherwise secured thereto.

The inner chute 30 likewise is formed of heavy sheet metal with one edge 30a rolled and with the curved forward portion having a downturned flange 30b for strength. It is supported solely by the left-hand side of the frame of my device (Fig. 2). More particularly, the upper portion of the chute is connected to posts 44 and 56 to support one side thereof while a diagonal brace 58 extends upwardly from member 36 and is joined to the rear portion of flange 30b to support the opposite side. At its lower end the chute is welded or otherwise secured to a cross bar 60 extending outwardly from the side member 36, this cross bar being braced by the diagonal member 61. Below bar 60 chute 30 has a downwardly and forwardly inclined lip 30c forming a widened entrance to the space between the two chutes.

Discharge chute 32 is hingedly mounted on posts 44 and 56 to swing about an axis 62 that is inclined slightly relative to the horizontal. The free end of the chute is supported by an adjustable brace comprising telescoping members 64, 65, the former of which is hingedly connected to the underside of the chute at 66, while the latter is hinged at 67 to the side member 36 of the frame. At the lower end of member 64 is a cross bore for receiving a pin 68 through any one of a series of longitudinally spaced holes in member 65 thereby to vary the length of the diagonal brace and consequently adjust the outward inclination of the discharge chute relative to the frame of my device. At one edge, the chute has an upstanding flange 32a which overlaps the lowermost end of the fixed discharge guide 34.

The large ground wheel 26 preferably is provided with traction cleats or lugs 26a spaced around its outer periphery. The hub of the wheel comprises an elongate sleeve 70 which is freely rotatable on the axle 27 but held against axial movement by a thrust collar 72 secured to the axle. The wheel has a first set of spokes 74 disposed in the plane of the rim 26; alternating with these are spokes 76 which are canted relative to this plane and secured to the elongate hub at the opposite end thereof to give the wheel greater lateral stability and strength. This second set of diagonal spokes carries a ring 78 which is welded to the individual spokes where it crosses same. Ring 78 is concentric with rim 26 but smaller in diameter and as will be clear from Figs. 2 and 3, it is disposed in a plane offset slightly relative to the plane of rim 26.

The two pusher bars 28 are mounted on the wheel at the points where a pair of opposite spokes 76 cross ring 78 and the supporting assembly is reinforced at these two points by diagonal braces 80 which form an integral part of the wheel structure. From the description given earlier, it will be understood that when a bale is being pushed up the chute 22 by one of the bars 28, the load of the bale is imposed upon the wheel at the mounting point of the pusher bar, making this reinforcement desirable in order to resist any strain tending to distort the shape of the wheel structure.

In practice it occasionally happens that one of the pusher bars 28 will be descending toward the bottom of its orbit at the same time a bale is entering the space between the longitudinal guides 20, 21; and because the bale has not progressed far enough along toward the bottom of chute 22 to permit the pusher bar to engage behind its end and advance it up the chute, the bar instead will come down on top of the bale. Accordingly, if the bar were made rigid with the structure of the large ground wheel, it will be seen that under this condition my device would tend to be lifted off the ground by virtue of the bar 28 bearing on top of the bale, which not only would foul the operation of the unit but quite possibly upset it or do other damage. For this reason, I prefer to mount the pusher bars on the large ground wheel in a manner which will permit them to swing inwardly toward axle 27 in the event one of them comes down on top of a bale. This permits the lifted arm to pass harmlessly over the bale as the latter continues its advance toward the lower end of chute 22; then the next pusher bar 28 will engage the end of the bale in proper manner to raise it up the chute and cause it to be discharged via the lateral chute 32 as has been described.

The manner in which each pusher bar is hinged to the large ground wheel can best be seen in Fig. 4. As will be apparent from that figure, the ring 78 is provided with a pair of apertured lugs 82 and the bar is hingedly mounted on a pivot pin 83 carried by these lugs so as to be free to swing in a plane radial to the axis of rotation of the wheel. A coiled spring 84 encircling the pivot pin with one end connected to the bar 28 and the other to one of said lugs biases the free end of the bar inwardly toward axle 27. However, the bar has an ear 28a cooperating with one of the lugs 82 to limit such inward movement whereby under the influence of the spring the bar normally projects perpendicular to the plane of rim 26 but is free to swing toward axle 27 against the tension of the spring in the event of the bar coming down on top of a bale in the fashion mentioned. In actual operation, centrifugal force assists the spring in maintaining the pusher bar in its normal position, that is to say, perpendicular to the plane of rim 26.

Each bale executes a 90° turn in being transferred from the upper end of the inner chute 30 to the lateral discharge chute 32. This takes place as a result of the forward end of the bale engaging the curved guide 34 as it approaches a position opposite the discharge chute. To prevent the pusher bar 28 from tearing the rear end of the bale as it executes this turn, I prefer to curve the outermost end of each pusher bar in a trailing direction relative to the direction of travel of the pusher bar. This assists in the aforementioned discharge of the bale and also eliminates any possibility of tearing the bale when it is initially engaged by the pusher bar as well as during the time it is being elevated to discharge position. During elevation, it will be noted that the bale is confined laterally between the curved guard 42 on one side and the ring 78 on the other, the radius of curvature of these two members being approximately the same.

Longitudinal guides 20 and 21 are provided with skids 85 at their forward ends and each slopes downwardly toward the rear so their trailing ends are close to the ground. This serves to stabilize the frame or carriage of my loader by limiting fore and aft rocking of same on the ground wheels. As previously suggested, the two guides diverge at their forward ends to facilitate entry of bales into the passageway therebetween. Guide 21 is the shorter of the two and has on the top thereof a horizontally disposed wheel 86 mounted to turn freely on a vertical spindle 87; the wheel has radiating tines or spikes 86a which are adapted to engage the side of a bale resting on the ground if same is canted relative to the path of travel of my loader and the wheel assists in turning the bale, in such cases, into proper longitudinal orientation thereto as the wheel 86 rolls along the side of the bale.

Guide 20 which projects somewhat farther forward than the guide 21 has a round nose shoe 88 at its end and a triangular baffle or gusset 90 just ahead of post 40, both of these members assisting the entry of bales into the passageway leading to the bottom of the chute 22. Baffle 88 conveniently is made of sheet metal and welded or otherwise secured at its marginal edges to the frame members 20, 40 and 91.

To facilitate attaching my loader to the bed of a truck, trailer or wagon, I provide on the forward side thereof a short central post 41 carried by the transverse frame members 38 and 43. Yoke 16 is swivelly connected to the post as shown in Fig. 1; arms 14 and 15 are individually hinged to the yoke as indicated at 13 and each has at its outer end a hinged clevis carrying a downwardly projecting pin 92 which may be inserted in one of the conventional stake pockets provided along the edge of the bed of the towing vehicle. Post 41 is provided with spaced holes along its length to permit attachment of the yoke 16 at a level corresponding to the upper surface of the truck bed 12 (see Fig. 2). Thus, my unit can be readily attached to and detached from any desired truck, trailer or wagon, regardless of the height of the bed.

On the side of my loader opposite wheel 46 I provide a similar wheel 93 whose axle is carried by a fork 94 having an integral longitudinally extending sleeve 95. This sleeve is rotatable on a stationary horizontal pipe 96 which is carried by the depending frame members 97. In the normal operation of my device, as has been described, the wheel is supported in inclined position by means of a pin 98 extending through registering holes in the sleeve 95 and supporting pipe 96. Under such condition the wheel is elevated above the ground and plays no part in the operation of the device.

However, when it is necessary to tow my device relatively long distances on the highway to a new site of operation, pin 98 is removed to swing the wheel down to the position shown by dotted lines in Fig. 2 and then is reinserted in registering holes in the sleeve and supporting pipe to hold it in this position. As will be seen from Fig. 2, the ground engaging surface of wheel 93 is now below that of the large wheel 26 so that the latter is raised from the ground. In this condition, my loader can be towed at relatively high speeds and without turning the large ground wheel 26. When the desired site of loading operations is reached, wheel 93 is simply restored to the position shown by the solid lines in Figs. 1 and 2 and the unit operates in normal fashion as has been described.

From the foregoing it will be seen that this invention is one well adapted to attain all of the ends and objects hereinbefore set forth, together with other advantages which are obvious which are inherent to the apparatus.

It will be understood that certain features and subcombinations are of utility and may be employed without reference to other features and subcombinations. This is contemplated by and is within the scope of the appended claims.

Inasmuch as many possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. In a bale loader, a mobile carriage having thereon a ground engaging wheel mounted to turn about a generally horizontal axis, a curved chute on said carriage substantially concentric with said axis, said chute having at its lower end a leading edge positioned close to the ground and said chute curving rearwardly and upwardly from said edge through an arc of more than 90° but less than 180°, a second chute on said carriage substantially concentric with said axis, said second chute being spaced radially inward from the upper portion of said first chute and the upper portion of said second chute projecting forwardly beyond the upper terminus of said first chute, and a pusher bar carried on said wheel in a position to travel in a path intermediate said two chutes upon rotation of the wheel.

2. A bale loader as in claim 1 wherein the path of said pusher bar is substantially equidistant from said two chutes.

3. A bale loader as in claim 1 wherein said pusher bar has one end affixed to said wheel so the bar projects outwardly therefrom parallel to the axis of rotation of the wheel.

4. A bale loader as in claim 3 wherein the outermost end of said bar is curved rearwardly in a trailing direction relative to the direction of travel of said bar.

5. A bale loader as in claim 1 wherein said pusher bar is swingably mounted on said wheel for limited movement in a plane radial to the axis of the wheel.

6. A bale loader as in claim 1 wherein one end of said pusher bar is pivotally mounted on said wheel for limited movement of the other end of said bar toward and away from the axis of rotation of the wheel, stop means limiting the outward movement of said bar, and spring means always biasing said bar outwardly.

7. A bale loader as in claim 6 wherein said bar is substantially parallel to the axis of rotation of said wheel when said bar is in its outermost position.

8. A bale loader as in claim 1 having curved guides substantially concentric with the axis of rotation of said wheel for confining a bale laterally during its travel along said chutes.

9. A bale loader as in claim 8 wherein one of said guides is a stationary part of said carriage and the other is an integral part of said wheel.

10. A bale loader as in claim 1 wherein said carriage has a pair of laterally spaced guides positioned on either side of said first chute and extending forward from the lower end thereof in close proximity to the ground.

11. A bale loader as in claim 10 wherein said carriage has a roller between said guides and adjacent to the lower end of said first chute.

12. A bale loader as in claim 10 wherein said longitudinal guides diverge at their forward ends.

13. A bale loader as in claim 12 wherein the forward extremity of each longitudinal guide has a ground engaging skid.

14. A bale loader as in claim 12 wherein one of said longitudinal guides has an upright spindle at its forward extremity, and a wheel on said spindle having outwardly projecting tines.

15. A bale loader as in claim 1 wherein said carriage has at the forward end of said second chute but above the level thereof a fixed deflecting member for diverting the course of bales laterally from said chute.

16. A bale loader as in claim 15 having a discharge chute beside the forward end of said second chute for receiving bales therefrom.

17. A bale loader as in claim 16 wherein said discharge chute is pivoted on said carriage, and an adjustable connection between said discharge chute and carriage for varying the angular relationship between the two.

18. A bale loader as in claim 1 having adjacent said ground engaging wheel a second wheel mounted on said carriage and shiftable between a raised position and a lowered position, said second wheel having a ground engaging portion positioned below the level of the bottom of said first wheel in said lowered position, and said portion being above the level of the bottom of said first wheel in said raised position.

19. A bale loader as in claim 1 having a yoke swivelly connected to the forward side of said carriage, a pair of arms hingedly connected to said yoke, and a pin at the outer end of each arm adapted for reception in a stake pocket on a towing vehicle.

20. A bale loader as in claim 19 wherein one of said arms is longer than the other.

No references cited.